United States Patent
Wei et al.

(10) Patent No.: US 10,063,291 B1
(45) Date of Patent: Aug. 28, 2018

(54) BALANCE PUZZLE ANTENNA BEAM SEARCHING METHOD FOR MULTI-INPUT MULTI-OUTPUT OPERATION

(71) Applicant: National Tsing Hua University, Hsinchu (TW)

(72) Inventors: Li-Ming Wei, Hsinchu (TW); Jen-Ming Wu, Hsinch (TW); Chin-Liang Wang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 15/725,619

(22) Filed: Oct. 5, 2017

(30) Foreign Application Priority Data

Apr. 28, 2017 (TW) .............................. 106114173 A

(51) Int. Cl.
   *H04B 7/02* (2018.01)
   *H04B 7/0417* (2017.01)
   *H04L 25/03* (2006.01)

(52) U.S. Cl.
   CPC ..... *H04B 7/0417* (2013.01); *H04L 25/03936* (2013.01)

(58) Field of Classification Search
   CPC ................ H04B 7/0417; H04B 7/0669; H04L 25/03936; H04L 1/0618; H04L 1/06; H04L 25/0204; H04L 27/2647; H04L 5/0007; H04L 27/2657; H04L 27/2662; H04L 5/0048
   USPC ................ 375/267, 260, 259, 295, 219, 316
   See application file for complete search history.

(56) References Cited

U.S. PATENT DOCUMENTS

| 2014/0055302 | A1* | 2/2014 | Jia ............................ H01Q 3/34 342/372 |
| 2015/0171945 | A1* | 6/2015 | Liu ...................... H04B 7/0456 375/267 |

FOREIGN PATENT DOCUMENTS

TW          201424419 A       6/2014

\* cited by examiner

*Primary Examiner* — Zewdu Kassa
(74) *Attorney, Agent, or Firm* — Birch, Stewart, Kolasch & Birch, LLP

(57) ABSTRACT

An antenna beam searching method uses a balance puzzle concept to perform group division of a plurality of antenna beams supported by a transmitter end, so as to perform evaluation on the antenna beam group(s) thus divided to determine an angle of departure of the transmitter end.

12 Claims, 12 Drawing Sheets

BALANCE PUZZLE ANTENNA BEAM SEARCHING METHOD FOR MULTI-INPUT MULTI-OUTPUT OPERATION

CROSS-REFERENCE TO RELATED APPLICATION

This application claims priority of Taiwanese Patent Application No. 106114173, filed on Apr. 28, 2017.

FIELD

The disclosure relates to antenna beam searching, and more particularly to an antenna beam searching method for multi-input multi-output (MIMO) operation.

BACKGROUND

Next generation cellular standards may leverage the large bandwidth available at millimeter wave (mm wave) frequencies to provide gigabit-per-second data rates in outdoor wireless systems. The main challenge in this high frequency band is to achieve high link margin. This challenge may be conquered using directional beamforming with large antenna arrays.

A conventional beam training protocol exhaustive search method is generally considered in tracking the angle of departure (AoD) and angle of arrival (AoA) for a MIMO channel. This method searches all possible beam directions for both the transmitter and the receiver. Referring to FIG. 1 as an example, for an antenna array of a transmitter end (Tx) and an antenna array of a receiver end (Rx) that have the same maximum resolution of N (where N=8 in FIG. 1), the complexity (steps) required for this method to adjust beamforming is $N^2$ (=64, i.e., the 1st stage to the 64th stage in FIG. 1). However, this operation takes a long time and has high complexity.

Another conventional beam training method is called bisection method, which is proposed by A. Alkhateeb, O. El Ayach, G. Leus and R. Heath in "Channel estimation and hybrid precoding for millimeter wave cellular systems", IEEE J. Sel. Topics Signal Process., vol. 8, no. 5, pp. 831-846, 204, and which uses an adaptive algorithm to estimate the mm wave channel and alleviates the problem mentioned above. This bisection method is also referred to hereinafter as "the first conventional bisection method." The bisection method performs angle estimation on the transmitter end and the receiver end at the same time. Referring to FIG. 2 as an example, for an antenna array of a transmitter end (Tx) and an antenna array of a receiver end (Rx) that have the same maximum resolution of N (where N=8 in FIG. 2), the method has a number $\log_2 N$ (=$\log_2 8$=3 in FIG. 2) of bisection stages where four searching procedures are performed in each bisection stage. In detail, in the first bisection stage, the transmitter end (Tx) sequentially transmits two first-stage training signals respectively through two different first-stage Tx antenna sectors each having a size of $\pi/2$ by executing sector sweeping. At this time, the receiver end (Rx) also executes sector sweeping to sequentially receive the first-stage training signals respectively via two different first-stage Rx antenna sectors each having a size of $\pi/2$. The receiver end (Rx) selects one of the first-stage Rx antenna sectors via which the first-stage training signal received has better signal quality (e.g., higher signal-to-noise ratio, SNR) to serve as a first-stage candidate Rx antenna sector that corresponds to a specific receiver end antenna beam, and issues a first-stage feedback signal indicating one of the first-stage training signals that has better signal quality at the receiver end (Rx). Upon receipt of the first-stage feedback signal, the transmitter end (Tx) selects one of the first-stage Tx antenna sectors via which the first-stage training signal indicated by the first-stage feedback signal is transmitted to serve as a first-stage candidate Tx antenna sector that corresponds to a specific transmitter end antenna beam. Accordingly, in the first bisection stage, a number of steps of adjusting beamforming is four. In the second bisection stage, the transmitter end (Tx) sequentially transmits two second-stage training signals respectively through two different second-stage Tx antenna sectors each having a size of $\pi/4$ and each being bisected from the first-stage candidate Tx antenna sector, by executing sector sweeping. At this time, the receiver end (Rx) also executes sector sweeping to sequentially receive the second-stage training signals respectively via two different second-stage Rx antenna sectors each having a size of $\pi/4$ and each being bisected from the first-stage candidate Rx antenna sector. The receiver end (Rx) selects one of the second-stage Rx antenna sectors via which the second-stage training signal received has better signal quality to serve as a second-stage candidate Rx antenna sector, and issues a second-stage feedback signal indicating one of the second-stage training signals that has better signal quality at the receiver end (Rx). Upon receipt of the second-stage feedback signal, the transmitter end (Tx) selects one of the second-stage Tx antenna sectors via which the second-stage training signal indicated by the second-stage feedback signal is transmitted to serve as a second-stage candidate Tx antenna sector. Accordingly, in the second bisection stage, a number of steps of adjusting beamforming is four. In the third bisection stage, the transmitter end (Tx) sequentially transmits two third-stage training signals respectively through two different third-stage Tx antenna sectors each having a size of $\pi/8$ and each being bisected from the second-stage candidate Tx antenna sector, by executing sector sweeping. At this time, the receiver end (Rx) also executes sector sweeping to sequentially receive the third-stage training signals respectively via two different third-stage Rx antenna sectors each having a size of $\pi/8$ and each being bisected from the second-stage candidate Rx antenna sector. The receiver end (Rx) selects one of the third-stage Rx antenna sectors via which the third-stage training signal received has better signal quality to serve as a target Rx antenna sector (i.e., AOA), and issues a third-stage feedback signal indicating one of the third-stage training signals that has better signal quality at the receiver end (Rx). Upon receipt of the third-stage feedback signal, the transmitter end (Tx) selects one of the third-stage Tx antenna sectors via which the third-stage training signal indicated by the third-stage feedback signal is transmitted to serve as a target Tx antenna sector (i.e., AOD). Accordingly, in the third bisection stage, a number of steps of adjusting beamforming is four. As a result, the total number of steps of adjusting beamforming is 4 $\log_2 N$ (=4×3=12 in FIG. 2). In addition, the receiver end (Rx) has to issue the first-stage, second-stage and third-stage feedback signals respectively corresponding to the first, second and third bisection stages to the transmitter end (Tx), which means that three feedback operations are required.

U.S. Patent Application Publication Nos. 2016/0087695 and 2016/0021549 propose another bisection method that performs estimation separately on the transmitter end and the receiver end. This bisection method is also referred to hereinafter as "the second conventional bisection method." In detail, the transmitter end first transmits the training signals while the receiver end operates in an omni-directional receiving mode to estimate the AoD, and then the AoA is estimated under a circumstance that the transmitter end operates at the AoD. Referring to FIG. 3 as an example, for an antenna array of a transmitter end (Tx) and an antenna array of a receiver end (Rx) that have the same maximum resolution of N (where N=8 in FIG. 3), the method has a number $\log_2 N$ (=$\log_2$ 8=3 in FIG. 3) of bisection stages for each of the transmitter end (Tx) and the receiver end (Rx), where two searching procedures are performed for each of the transmitter end (Tx) and the receiver end (Rx) in each bisection stage. In detail, in the first Tx bisection stage, the transmitter end (Tx) sequentially transmits two first-stage training signals respectively through two different first-stage Tx antenna sectors each having a size of $\lambda/2$ and, by executing sector sweeping. At this time, the receiver end (Rx) omni-directionally and sequentially receives the first-stage training signals, and issues a first-stage feedback signal indicating one of the first-stage training signals that has better signal quality at the receiver end (Rx). Upon receipt of the first-stage feedback signal, the transmitter end (Tx) selects one of the first-stage Tx antenna sectors via which the first-stage training signal indicated by the first-stage feedback signal is transmitted to serve as a first-stage candidate Tx antenna sector. Accordingly, in the first Tx bisection stage, a number of steps of adjusting beamforming is two. In the second Tx bisection stage, the transmitter end (Tx) sequentially transmits two second-stage training signals respectively through two different second-stage Tx antenna sectors each having a size of $\pi/4$ and each being bisected from the first-stage candidate Tx antenna sector, by executing sector sweeping. At this time, the receiver end (Rx) omni-directionally and sequentially receives the second-stage training signals, and issues a second-stage feedback signal indicating one of the second-stage training signals that has better signal quality at the receiver end (Rx). Upon receipt of the second-stage feedback signal, the transmitter end (Tx) selects one of the second-stage Tx antenna sectors via which the second-stage training signal indicated by the second-stage feedback signal is transmitted to serve as a second-stage candidate Tx antenna sector. Accordingly, in the second Tx bisection stage, a number of steps of adjusting beamforming is two. In the third Tx bisection stage, the transmitter end (Tx) sequentially transmits two third-stage training signals respectively through two different third-stage Tx antenna sectors each having a size of $\pi/8$ and each being bisected from the second-stage candidate Tx antenna sector, by executing sector sweeping. At this time, the receiver end (Rx) omni-directionally and sequentially receives the third-stage training signals, and issues a third-stage feedback signal indicating one of the third-stage training signals that has better signal quality at the receiver end (Rx). Upon receipt of the third-stage feedback signal, the transmitter end (Tx) selects one of the third-stage Tx antenna sectors via which the third-stage training signal indicated by the third-stage feedback signal is transmitted to serve as a target Tx antenna sector (i.e., AoD). Accordingly, in the third Tx bisection stage, a number of steps of adjusting beamforming is two. In the first Rx bisection stage, the transmitter end (Tx) continuously transmits a training signal through the target Tx antenna sectors. At this time, the receiver end (Rx) executes sector sweeping to sequentially receive the training signal respectively via two different first-stage Rx antenna sectors each having a size of $\pi/2$. The receiver end (Rx) selects one of the first-stage Rx antenna sectors via which the training signal received has better signal quality to serve as a first-stage candidate Rx antenna sector. Accordingly, in the first Rx bisection stage, a number of steps of adjusting beamforming is two. In the second Rx bisection stage, the transmitter end (Tx) continuously transmits the training signal through the target Tx antenna sectors. At this time, the receiver end (Rx) executes sector sweeping to sequentially receive the training signal respectively via two different second-stage Rx antenna sectors each having a size of $\pi/4$ and each being bisected from the first-stage candidate Rx antenna sector. The receiver end (Rx) selects one of the second-stage Rx antenna sectors via which the training signal received has better signal quality to serve as a second-stage candidate Rx antenna sector. Accordingly, in the second Rx bisection stage, a number of steps of adjusting beamforming is two. In the third Rx bisection stage, the transmitter end (Tx) continuously transmits the training signal through the target Tx antenna sectors. At this time, the receiver end (Rx) executes sector sweeping to sequentially receive the training signal respectively via two different third-stage Rx antenna sectors each having a size of $\pi/8$ and each being bisected from the second-stage candidate Rx antenna sector. The receiver end (Rx) selects one of the third-stage Rx antenna sectors via which the training signal received has better signal quality to serve as a target Rx antenna sector (i.e., AoA). Accordingly, in the third Rx bisection stage, a number of steps of adjusting beamforming is two. As a result, the number of total steps of adjusting beamforming is 2 ($\log_2$ N+$\log_2$ N) (=2×(3+3)=12 in FIG. 3). In addition, the receiver end (Rx) has to issue the first-stage, second-stage and third-stage feedback signals respectively corresponding to the first, second and third Tx bisection stages to the transmitter end (Tx), which means that three feedback operations are required.

SUMMARY

Therefore, an object of the disclosure is to provide an antenna beam searching method for MIMO operation that may further reduce complexity and time required for searching.

According to the disclosure, the antenna beam searching method is implemented by a wireless multi-input multi-output (MIMO) communication system that includes a transmitter end and a receiver end. The transmitter end has a multi-resolution antenna array which supports a plurality of antenna beams having different beam directions. One of the antenna beams is a target antenna beam that corresponds to the receiver end. The method includes: dividing, by the transmitter end, the antenna beams into a first-stage balance group which has an even number of the antenna beams and which corresponds to a first-stage balance antenna sector, and a first-stage remainder group which has the antenna beam (s) other than said even number of the antenna beams; executing, by the transmitter end, a first-stage sector sweeping procedure which is associated with the first-stage balance antenna sector and which employs a balance puzzle concept and a hierarchical multi-resolution codebook; determining, by the transmitter end upon receipt of a first feedback signal that is associated with a first evaluation result of the first-stage sector sweeping procedure, whether or not the target antenna beam is included in the first-stage balance group according to the first feedback signal; acquiring, by the transmitter end when determining that the target antenna beam is included in the first-stage balance group, a first-stage sub-group of the antenna beam(s) inclusive of the target antenna beam from the antenna beams of the first-stage balance group according to the first feedback signal, and determining the target antenna beam from the first-stage sub-group by executing a first beam searching procedure that employs the hierarchical multi-resolution codebook; and determining, by the transmitter end when determining that the target antenna beam is not included in the first-stage balance group, the target antenna beam from the first-stage remainder group by executing a second beam searching procedure that employs the hierarchical multi-resolution codebook.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
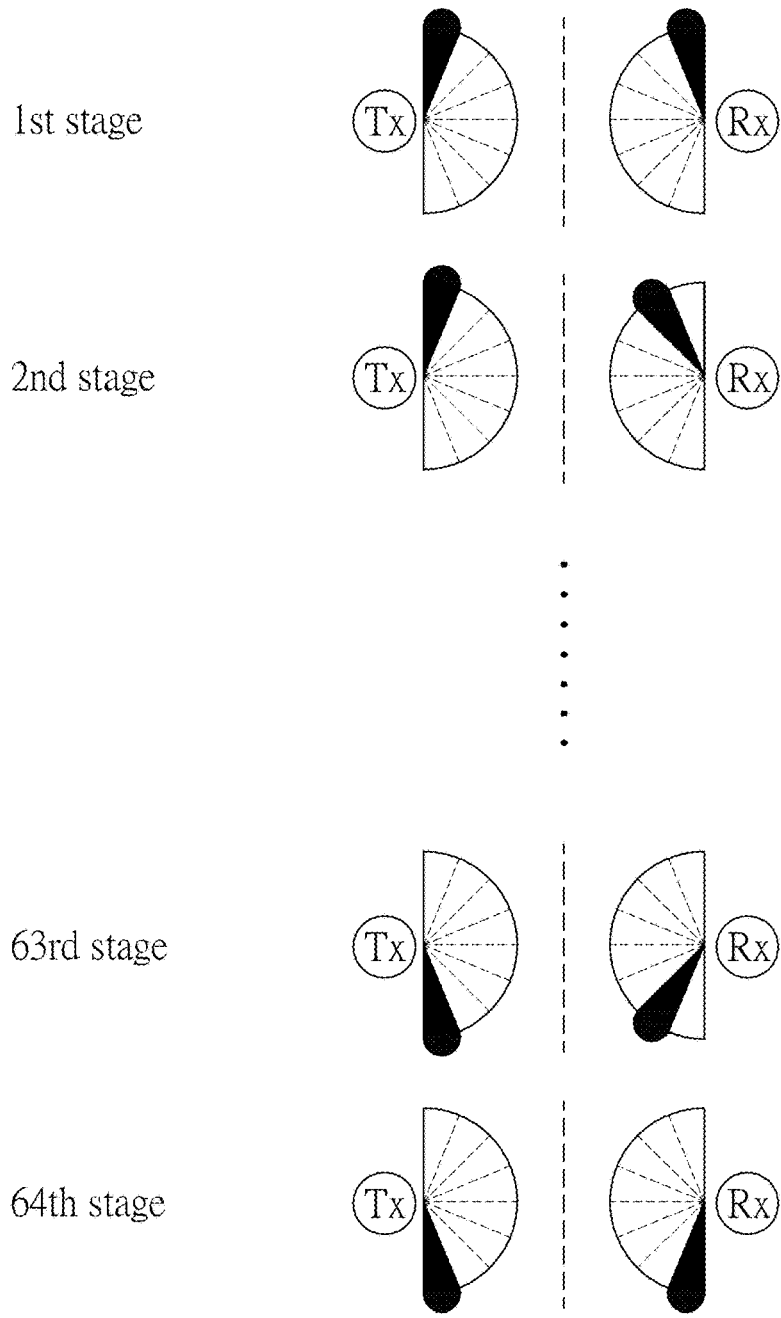
FIG. 1 is a schematic diagram illustrating a conventional exhaustive search method.
Figure 2:
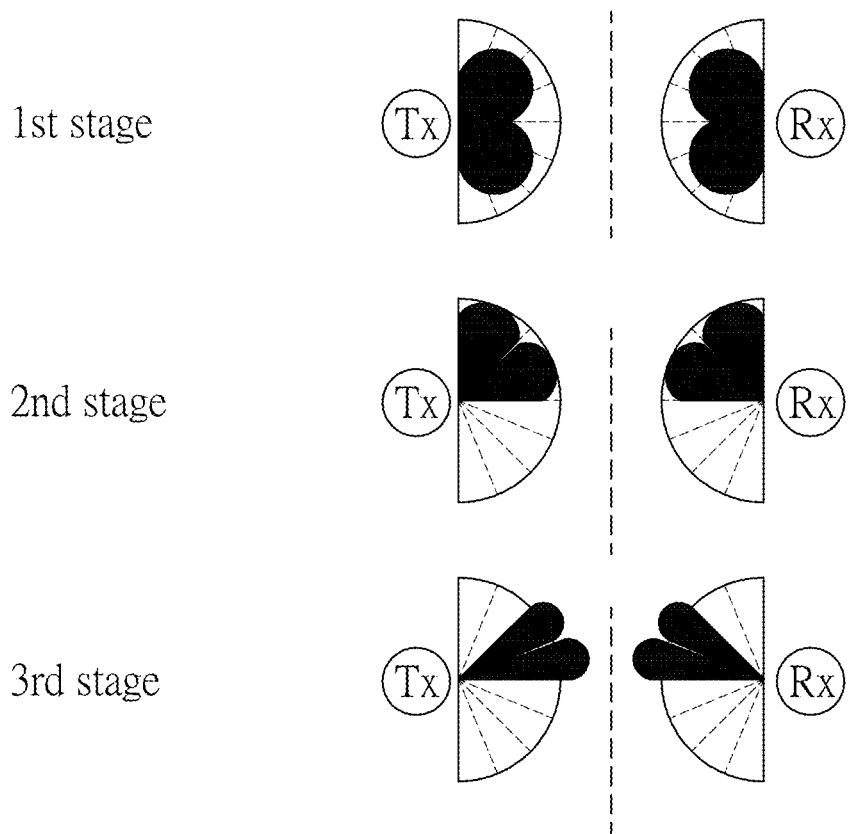
FIG. 2 is a schematic diagram illustrating a first conventional bisection method.
Figure 3:
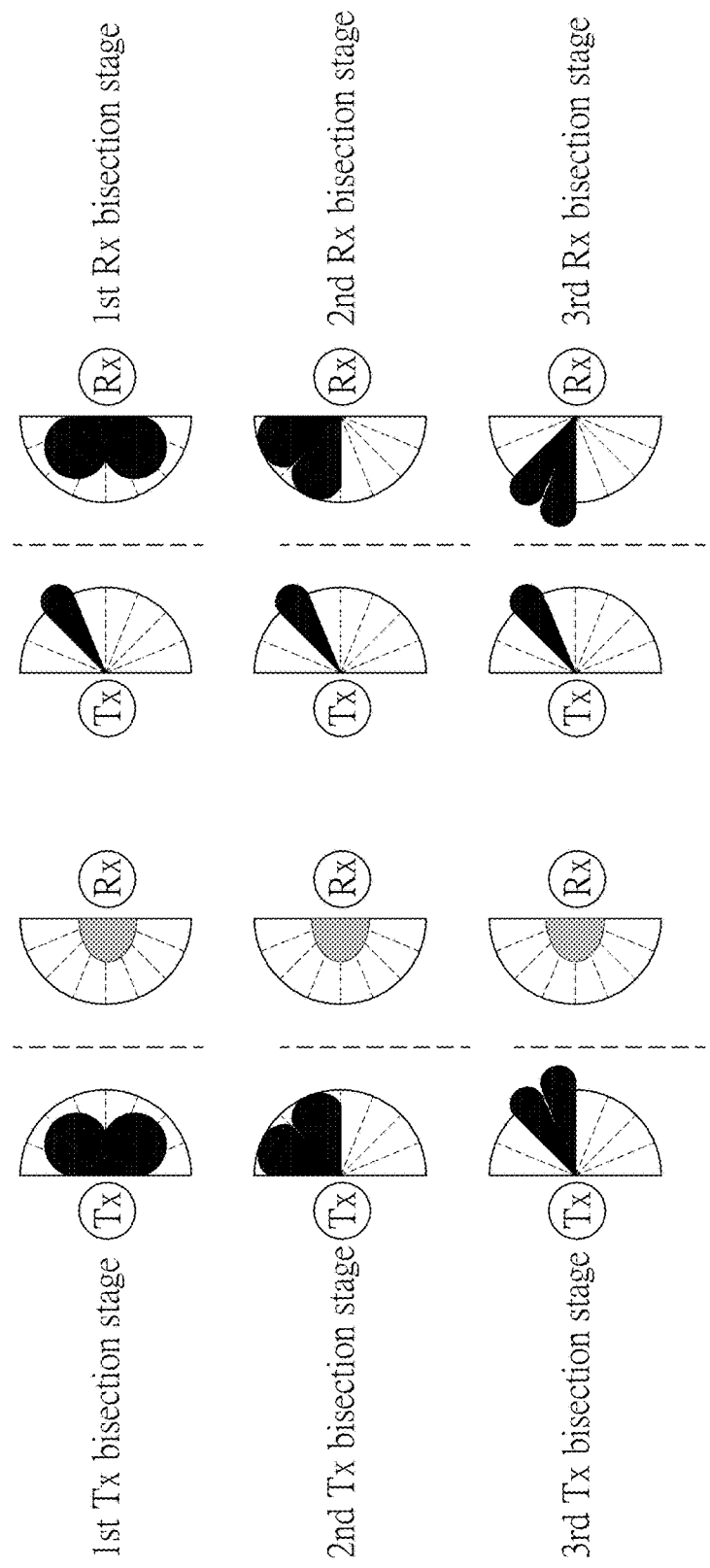
FIG. 3 is a schematic diagram illustrating a second conventional bisection method.

Before the disclosure is described in greater detail, it should be noted that where considered appropriate, reference numerals or end portions of reference numerals have been repeated among the figures to indicate corresponding or analogous elements, which may optionally have similar characteristics.

Figure 4:
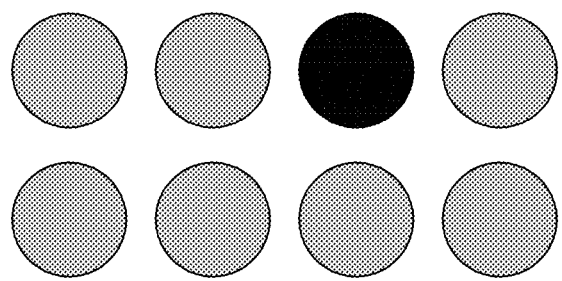
FIGS. 4 to 6 are schematic diagrams illustrating a balance puzzle concept.
Figure 5:
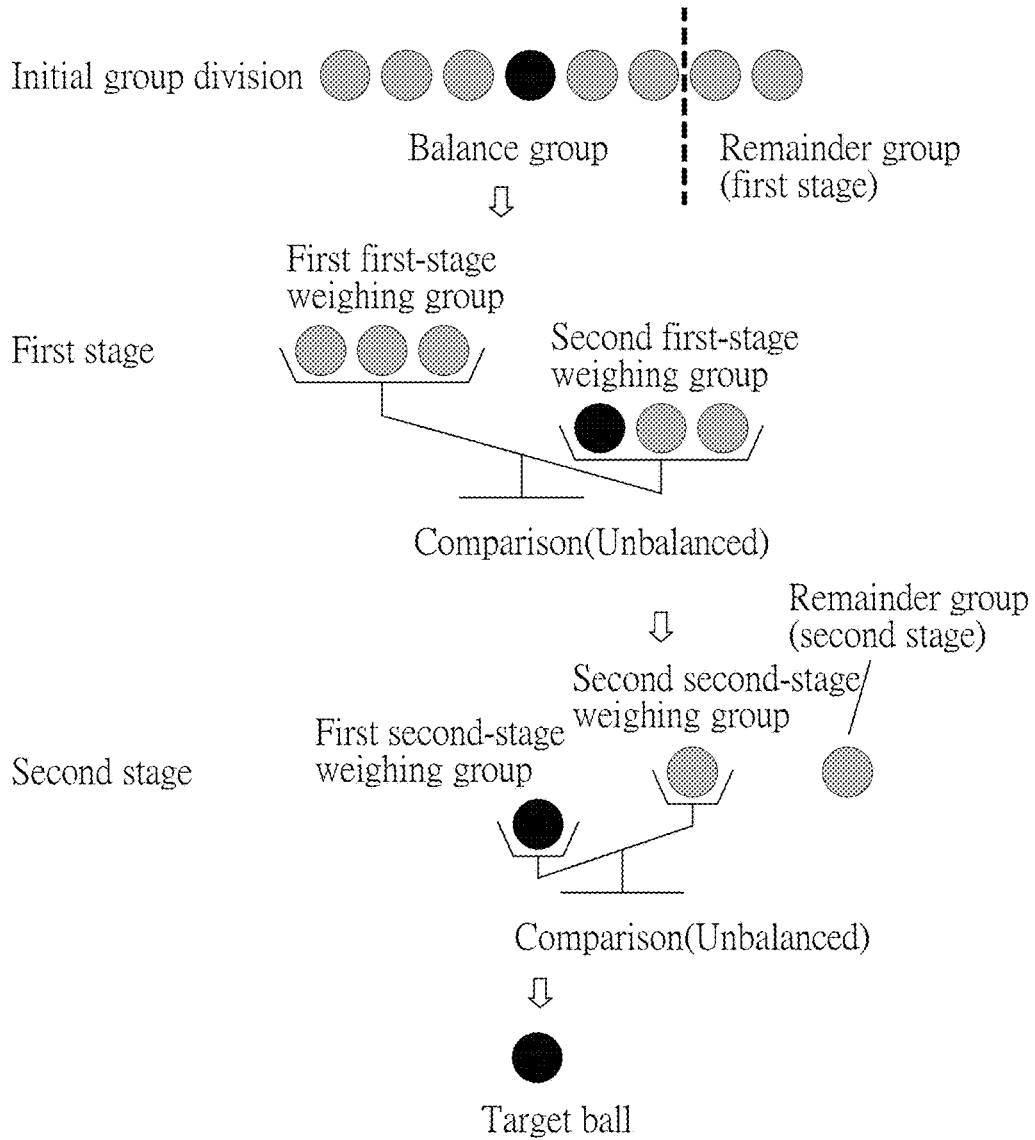
Figure 6:
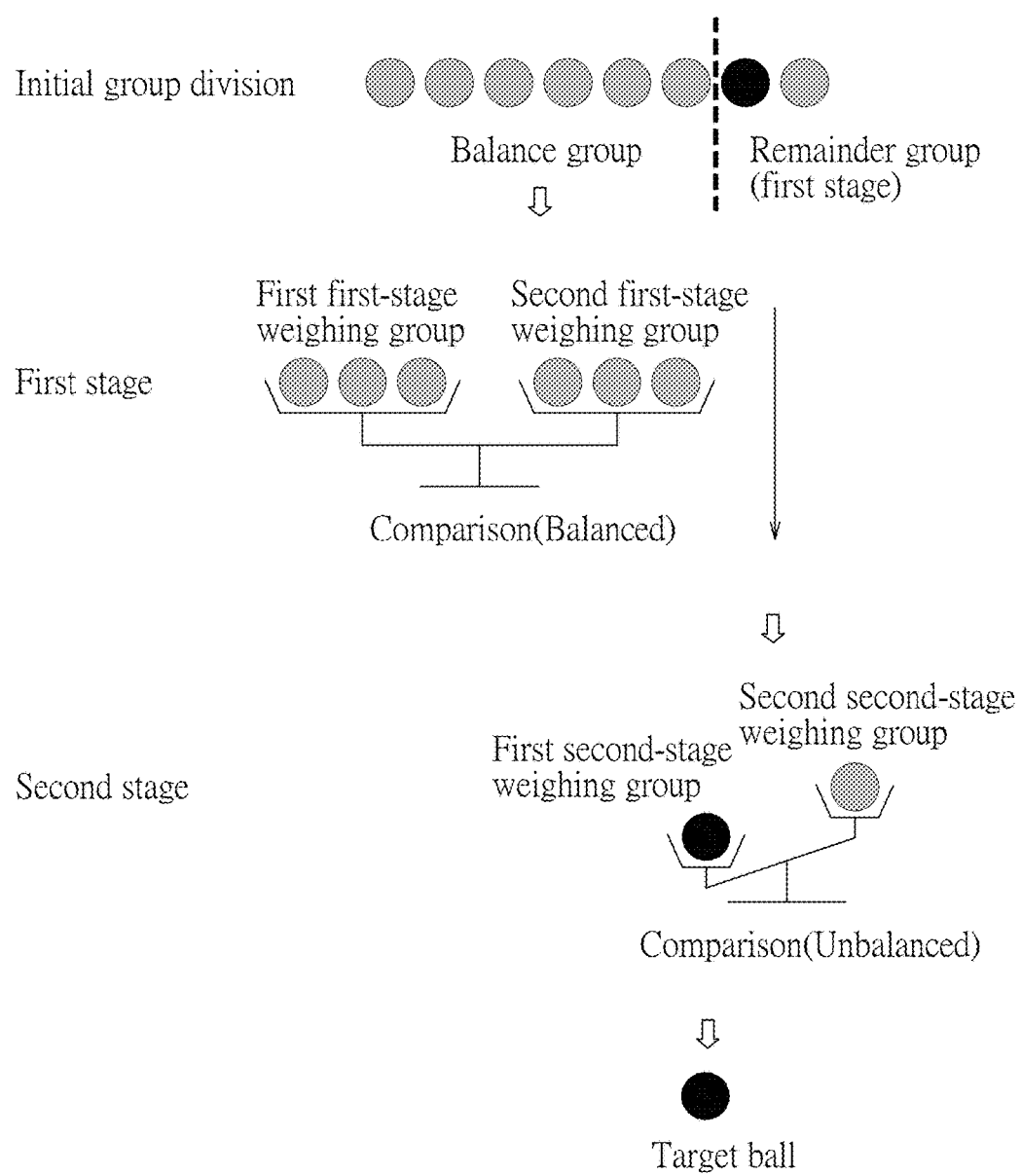

Referring to FIGS. 4-6, a balance puzzle concept used in the embodiment of the antenna beam searching method for MIMO operation according to this disclosure is simply illustrated. FIG. 4 shows eight balls with identical appearance among which seven balls (colored in gray in FIGS. 4-6) have the same weight and one ball (colored in black in FIGS. 4-6) is heavier than the others. The balance puzzle concept may be used to find the heavier one (i.e., the ball colored in black in FIGS. 4-6, called the target ball hereinafter) with a minimum number of balancing steps. Referring to FIGS. 5 and 6, according to the balance puzzle concept, the eight balls are divided into a balance group which includes an even number (e.g., six in FIGS. 5 and 6) of the balls, and a remainder group which includes the balls (e.g., two balls in FIGS. 5 and 6) other than those belonging to the balance group. In a first case as shown in FIG. 5, where the target ball belongs to the balance group, the six balls of the balance group are bisected into a first first-stage weighing group and a second first-stage weighing group each of which has three balls. When the first and second first-stage weighing groups are respectively placed at two sides of a balance, an unbalance result would be obtained, and it is known that the target ball is included in the heavier weighing group. Such operation (group division, bisection and balancing, and comparing) is then performed again on the heavier weighing group (e.g., the second first-stage weighing group in FIG. 5) at a second stage of balancing, and the target ball is found. In a second case as shown in FIG. 6, where the target ball belongs to the remainder group, the six balls of the balance group are bisected into a first first-stage weighing group and a second first-stage weighing group each of which has three balls. When the first and second first-stage weighing groups are respectively placed at two sides of a balance, a balance result would be obtained, and it is known that the target ball is included in the remainder group. Such operation (group division, bisection and balancing, and comparing) is then performed again on the remainder group at the second stage of balancing, and the target ball is found.

Figure 7:
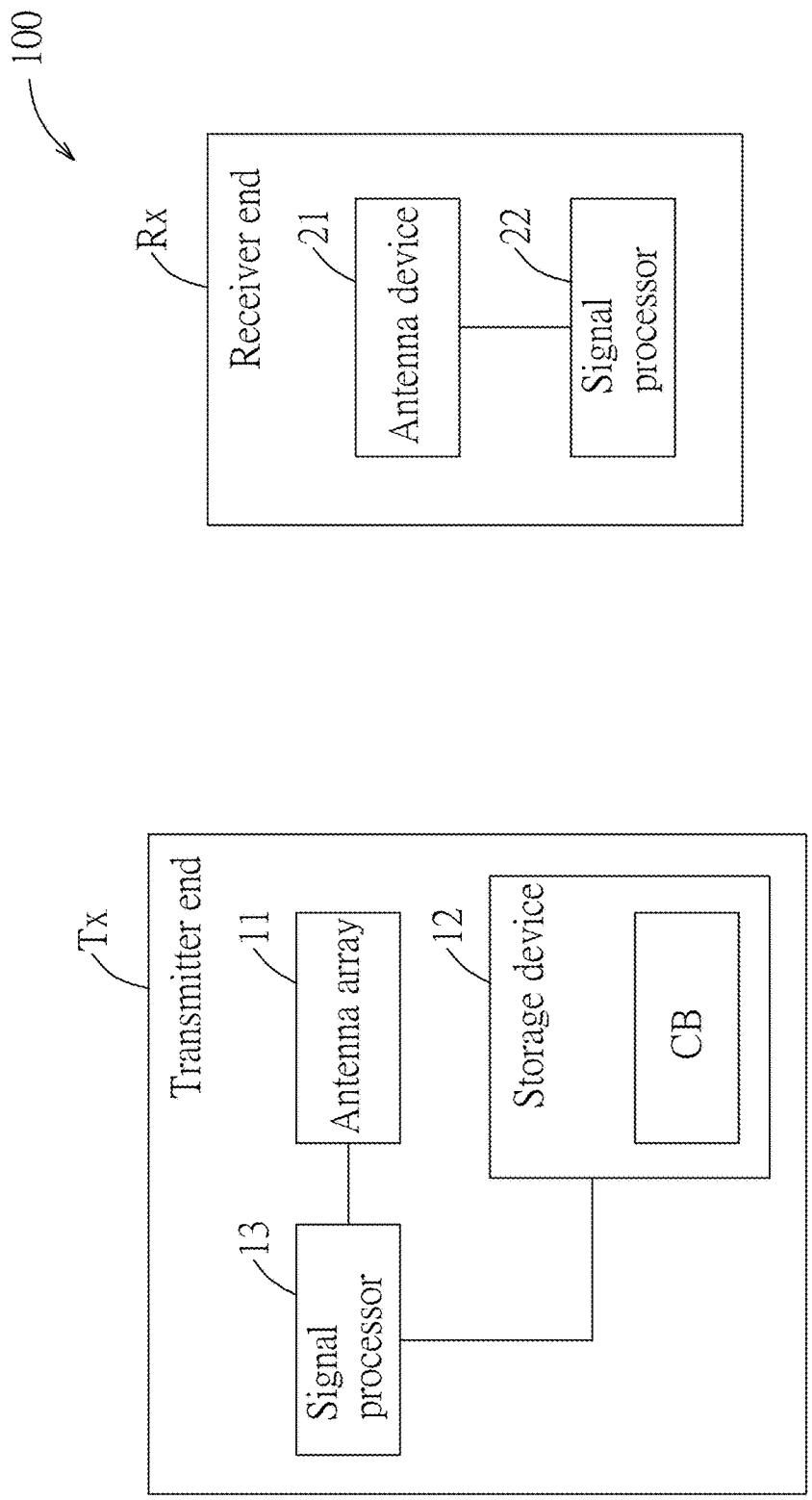
FIG. 7 is a block diagram illustrating a wireless MIMO system used to implement an embodiment of the antenna beam searching method according to this disclosure.

Referring to FIG. 7, a wireless MIMO communication system 100 is shown to implement an embodiment of the balance puzzle antenna beam searching method according to this disclosure. The MIMO communication system 100 includes a transmitter end (Tx) and a receiver end (Rx). In this embodiment, the transmitter end (Tx) may be realized as, for example but not limited to, a base station, and includes an antenna array 11 with a resolution of N, a storage device 12 and a signal processor 13 coupled to the antenna array 11 and the storage device 12. The antenna array 11 supports a number N of antenna beams which have different beam directions corresponding to the antenna array 11 (i.e., each antenna beam has an individual radiation angle). The storage device 12 stores a hierarchical multi-resolution codebook (CB) which includes a plurality of beamforming vector groups. The beamforming vector groups include different numbers of beamforming vectors and correspond to different beam widths. The receiver end (Rx) may be realized as, for example but not limited to, a mobile device (e.g., a smartphone, a tablet computer, a notebook computer, etc.), and includes an antenna device 21, and a signal processor 22 coupled to the antenna device 21. In this embodiment, the antenna device 21 may be realized as an omni-directional antenna or an antenna array with a resolution of N'. It should be noted that one of the antenna beams supported by the antenna array 11 of the transmitter end (Tx) is a target antenna beam corresponding to the receiver end (Rx) (i.e., the best transmission channel of the transmitter end (Tx) with respect to the receiver end (Rx)).

Figure 8:
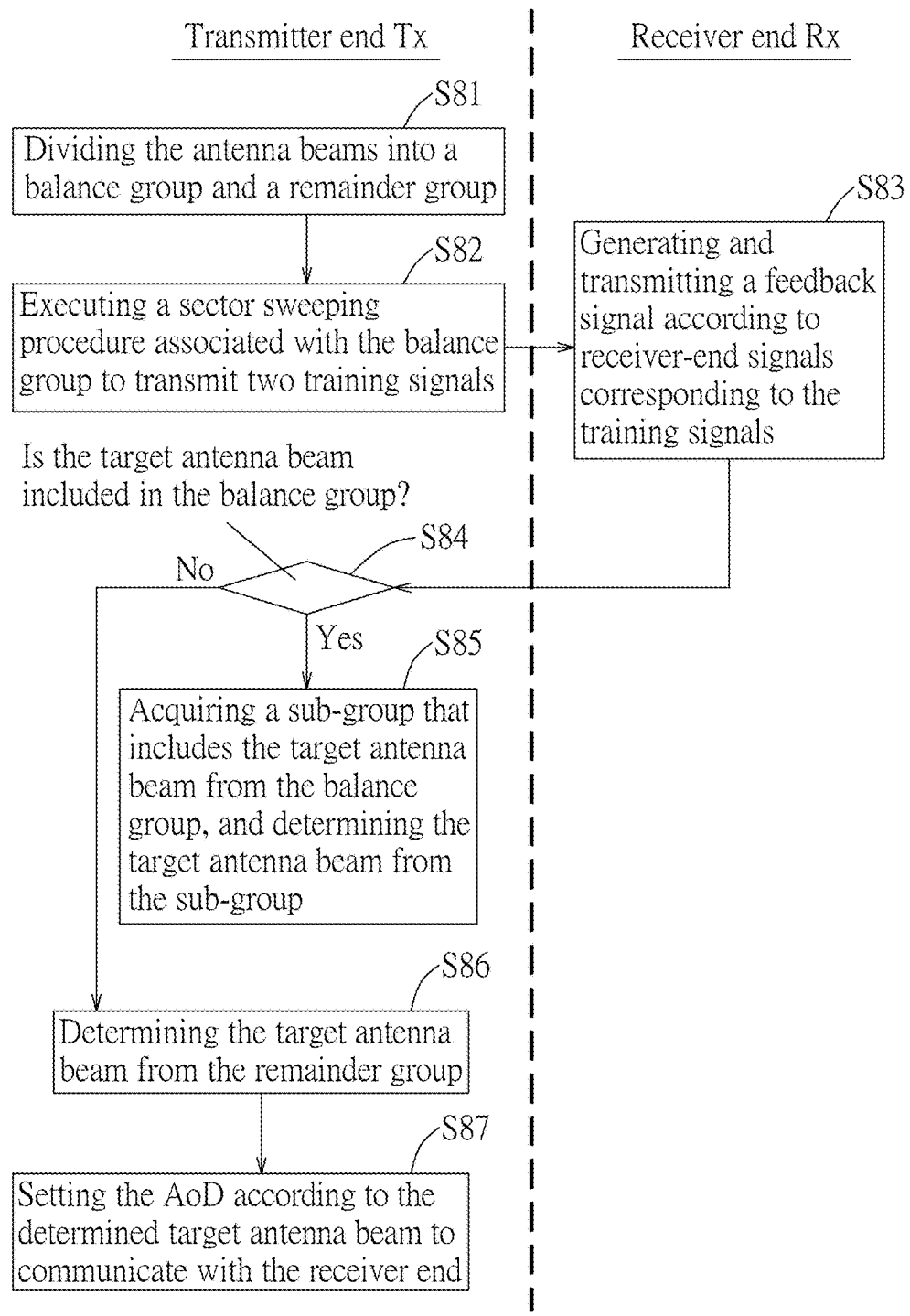
FIG. 8 is a flow chart illustrating steps of the embodiment.

Further referring to FIG. 8, the embodiment of the antenna beam searching method according to this disclosure includes steps of S81 to S87.

Based on the balance puzzle concept, the number N of the antenna beams may be analogous to N balls with identical appearance, and the target antenna beam may be analogous to the target ball (the heavier one of the balls).

In step S81, the signal processor 13 of the transmitter end (Tx) executes a group division processing, i.e., using the balance puzzle concept to divide the N antenna beams into a first-stage balance group which has an even number of the antenna beams and which corresponds to a first-stage balance antenna sector, and a first-stage remainder group which has the antenna beam(s) other than said even number of the antenna beams. In this embodiment, a number of the antenna beams of the first-stage balance group is far greater than that of the first-stage remainder group. It is noted that the number N is not limited to being a power of two ($2^n$, where n is an integer). The number of the antenna beams of the first-stage remainder group is an even number greater than or equal to two when N is an even number, and the number of the antenna beams of the first-stage remainder group is an odd number greater than or equal to one when N is an odd number.

In step S82, the transmitter end (Tx) executes a first-stage sector sweeping procedure which is associated with the first-stage balance antenna sector and which employs the balance puzzle concept and the hierarchical multi-resolution codebook (CB) stored in the storage device 12. In detail, in the first-stage sector sweeping procedure, the transmitter end (Tx) uses the balance puzzle concept to perform sector sweeping on the first-stage balance antenna sector, so that the signal processor 13 uses, according to the hierarchical multi-resolution codebook (CB) stored in the storage device 12, two beamforming vectors each of which has a beam width that matches a respective one of first-stage bisection antenna sectors bisected from the first-stage balance antenna sector to generate two first-stage training signals, and transmits each of the first-stage training signals via a corresponding one of the first-stage bisection antenna sectors in, for example a discrete-time manner that conforms to a narrowband time-invariant wireless channel model. In this embodiment, it is assumed that a link between the transmitter end (Tx) and the receiver end (Rx) is free of interference (i.e., under a circumstance of high signal-to-noise ratio), and only one propagation path is provided between the transmitter end (Tx) and the receiver end (Rx) (e.g., adopting a Saleh-Valenzuela channel model).

In step S83, the receiver end (Rx) receives two first-stage receiver-end signals (denoted as s1, s2 hereinafter) respectively corresponding to the first-stage training signals (i.e., the first-stage receiver-end signals is the first-stage training signals received by the receiver end (Rx)), and generates and transmits the first feedback signal that is associated with a first evaluation result of the first-stage sector sweeping procedure according to the first-stage receiver-end signals. In this embodiment, the signal processor 22 determines whether or not a ratio of strength of either one of the first-stage receiver-end signals to strength of the other one of the first-stage receiver-end signals (hereinafter, E[s1] represents the strength of the first-stage receiver-end signal (s1), and E[s2] represents the strength of the first-stage receiver-end signal (s2)) is not smaller than a predetermined threshold value $\eta$. In other words, the signal processor 22 determines whether or not any one of E[s1]/E[s2] and E[s2]/E[s1] is greater than or equal to the predetermined threshold value $\eta$. According to the determination result, the signal processor 22 obtains the first evaluation result that indicates whether or not the first-stage receiver-end signals are unbalanced in terms of signal strength and which one of the first-stage training signals corresponds to one of the first-stage receiver-end signals that has the greater signal strength, and generates the first feedback signal which corresponds to the first evaluation result. In detail, when the determination result is affirmative, i.e., E[s1]/E[s2]≥$\eta$ or E[s1]/E[s2]≥$\eta$, the first evaluation result indicates that the first-stage receiver-end signals are unbalanced in terms of signal strength and which one of the first-stage training signals (s1, s2) corresponds to the first-stage training signal that has the greater signal strength; and when the determination result is negative, i.e., E[s1]/E[s2]≤$\eta$ and E[s2]/E[s1] <$\eta$, the first evaluation result indicates that the first-stage receiver-end signals are balanced in terms of signal strength and also indicates which one of the first-stage training signals (s1, s2) corresponds to the first-stage training signal that has the greater signal strength. In this embodiment, $1 \le \eta \le \sqrt{1+SNR}$, where SNR represents a signal-to-noise ratio of the receiver end (Rx). In this embodiment, the SNR is 30 dB, but this disclosure is not limited thereto. The first feedback signal may a 2-bit signal that has a first bit indicating whether or not the first-stage receiver-end signals are unbalanced in terms of signal strength, and a second bit indicating which one of the first-stage training signals corresponds to one of the first-stage receiver-end signals that has the greater signal strength, but this disclosure is not limited thereto.

In step S84, upon receipt of the first feedback signal via the antenna array 11, the signal processor 13 of the transmitted end (Tx) determines whether or not the target antenna beam is included in the first-stage balance group according to the first feedback signal. The flow goes to step S85 when the determination is affirmative, and goes to step S86 when otherwise. In detail, the transmitter end (Tx) determines that the target antenna beam is included in the first-stage balance group h according to the first feedback signal when the first evaluation result indicates that the first-stage receiver-end signals are unbalanced in terms of signal strength, and determines that the target antenna beam is not included in the first-stage balance group (i.e., the target antenna beam is included in the first-stage remainder group) according to the first feedback signal when the first evaluation result indicates that the first-stage receiver-end signals are balanced in terms of signal strength.

In step S85, the signal processor 13 of the transmitter end (Tx) acquires a first-stage sub-group of the antenna beam(s) inclusive of the target antenna beam from the antenna beams of the first-stage balance group according to the second bit of the first feedback signal. In this embodiment, the first-stage sub-group of the antenna beam(s) includes half of the antenna beams of the first-stage balance group, and corresponds to one of the first-stage bisection antenna sectors via which one of the first-stage training signals that is indicated by the first feedback signal (first evaluation result) to correspond to one of the first-stage receiver-end signals having the greater signal strength is transmitted. Then, the transmitter end (Tx) determines the target antenna beam from the first-stage sub-group by executing a first beam searching procedure that employs the hierarchical multi-resolution codebook. It is noted that the first beam searching procedure may be determined according to the number of the antenna beams of the first-stage sub-group. For example, when the number of the antenna beams of the first-stage sub-group is not smaller three, the first beam searching procedure may include a step of the signal processor 13 dividing the antenna beams of the first-stage sub-group into a first second-stage group which corresponds to a second-stage antenna sector included in the first-stage balance antenna sector, and a second second-stage group. In one embodiment, a number of the antenna beams of the first second-stage group is greater than that of the second second-stage group. The first beam searching procedure may further include but not limited to a step of the transmitter end (Tx) executing, for the first second-stage group, a second-stage sector sweeping procedure which is associated with the second-stage antenna sector and which employs the hierarchical multi-resolution codebook to generate a plurality of second-stage training signals so that the receiver end (Rx) may perform an operation similar to step S83 to generate and transmit a second feedback signal that is associated with a second evaluation result corresponding to the second-stage sector sweeping procedure. It is noted that, when the number of the antenna beams of the first second-stage group is an even number, the second-stage sector sweeping procedure is same as the first-stage sector sweeping procedure if the first second-stage group is taken as the first-stage balance group, but this disclosure is not limited thereto. In other embodiments, the second-stage sector sweeping procedure may be the conventional exhaustive search method or bisection method. Upon receipt of the second feedback signal, the transmitter end (Tx) performs an operation similar to step S84, that is, determining whether or not the target antenna beam is included in the first second-stage group according to the second feedback signal. Upon determining that the target antenna beam is included in the first second-stage group, the transmitter end (Tx) further determines the target antenna beam from the antenna beams of the first second-stage balance group according to the second feedback signal. Similarly, the transmitter end (Tx) may select the abovementioned balance puzzle concept, the conventional exhaustive search method or the conventional bisection method according to the number of the antenna beam(s) of the first second-stage group to proceed with subsequent operations until the target antenna beam is determined. On the other hand, upon determining that the target antenna beam is not included in the first second-stage group, the transmitter end (Tx) further determines the target antenna beam from the antenna beams of the second second-stage balance group according to the second feedback signal. Similarly, the transmitter end (Tx) may select the abovementioned balance puzzle concept, the conventional exhaustive search method or the conventional bisection method according to the number of the antenna beam(s) of the second second-stage group to proceed with subsequent operations. In one example, when it is determined that the target antenna beam is not included in the first second-stage group and the second second-stage group has only one antenna beam, the signal processor 13 may directly determine that the antenna beam of the second second-stage group is the target antenna beam without performing any further operation. When it is determined that the target antenna beam is not included in the first second-stage group and the second second-stage group has more than one antenna beam, the signal processor 13 selectively adapts one of the abovementioned balance puzzle concept, the conventional exhaustive search method and the conventional bisection method to proceed with subsequent operations until the target antenna beam is determined from the second second-stage group.

In step S86, the transmitter end (Tx) determines the target antenna beam from the first-stage remainder group by executing a second beam searching procedure that employs the hierarchical multi-resolution codebook. Similarly, the transmitter end (Tx) may select the abovementioned balance puzzle concept, the conventional exhaustive search method or the conventional bisection method according to the number of the antenna beam(s) of the first-stage remainder group to proceed with subsequent operations until the target antenna beam is determined from the first-stage remainder group.

In step S87, the transmitter end (Tx) sets the AoD of the antenna array 11 according to the target antenna beam thus determined, an angle of departure of the multi-resolution antenna array of the transmitter end (Tx), and communicates with the receiver end (Rx) according to the AoD thus set.

Figure 9:
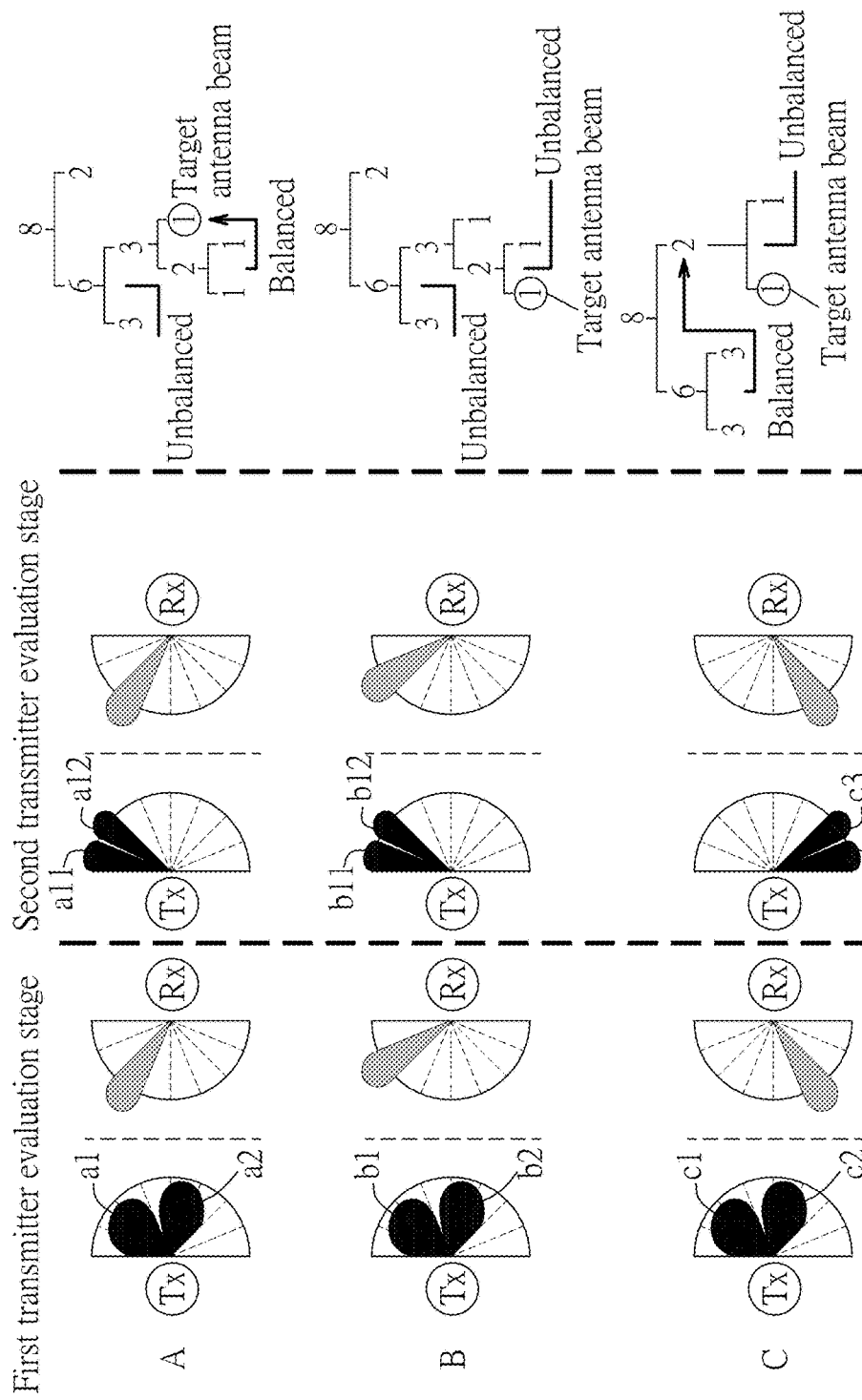
FIG. 9 is a schematic diagram illustrating three possible cases of the embodiment when the antenna resolution of the transmitter end is eight.

Referring to FIGS. 7, 8 and 9, an example is provided to illustrate operations of the embodiment. In this example, the antenna array 11 has a resolution of eight (i.e., N=8), and three possible cases A, B, C of the embodiment are exemplified herein.

In case A, in the first transmitter evaluation stage, the eight antenna beams are divided into a first-stage balance group having six of the antenna beams, and a first-stage remainder group having the remaining two of the antenna beams. The transmitter end (Tx) executes a sector sweeping procedure corresponding to the first-stage balance group to transmit two first-stage training signals respectively through two first-stage bisection antenna sectors (a1, a2) each having the same size of $3\pi/8$. At this time, the receiver end (Rx) may omni-directionally receive the first-stage training signals to obtain first-stage receiver-end signals that respectively correspond to the first-stage training signals, and according to the first-stage receiver-end signals, generate and transmit, via an antenna sector of the antenna device 21 (e.g., the gray antenna sector in FIG. 9) by executing beamforming operation, a first feedback signal that indicates that the first-stage receiver-end signals are unbalanced and which first-stage training signal corresponds to the first-stage receiver-end signal having the greater signal strength. After receipt of the first feedback signal from the receiver end (Rx), the transmitter end (Tx) determines that the target antenna beam is included in the first-stage balance group according to the first feedback signal, and that the target antenna beam is included in a first-stage sub-group of the antenna beams corresponding to the first-stage bisection antenna sector (a1). Accordingly, a number of adjusting beamforming in the first transmitter evaluation stage is two. In the second transmitter evaluation stage, the three antenna beams of the first-stage sub-group are divided based on the balance puzzle concept into a second-stage balance group having two of the antenna beams, and a second-stage remainder group having the remaining one of the antenna beams. The transmitter end (Tx) executes a sector sweeping procedure corresponding to the second-stage balance group to transmit two second-stage training signals respectively through two second-stage bisection antenna sectors (a11, a12) each having the same size of $\pi/8$. At this time, the receiver end (Rx) may omni-directionally receive the second-stage training signals to obtain second-stage receiver-end signals that respectively correspond to the second-stage training signals, and according to the second-stage receiver-end signals, generate and transmit a second feedback signal that indicates that the second-stage receiver-end signals are balanced and which second-stage training signal corresponds to the second-stage receiver-end signal having the greater signal strength. After receipt of the second feedback signal from the receiver end (Rx), the transmitter end (Tx) determines that the target antenna beam is not included in the second-stage balance group according to the second feedback signal, and that the target antenna beam is included in the second-stage remainder group. Accordingly, sector sweeping corresponding to the second-stage remainder group may be omitted, and a number of adjusting beamforming in the second transmitter evaluation stage is two. As a result, in case A, four times of the beamforming adjustment for the transmitter end (Tx) and two feedbacks from the receiver end (Rx) (i.e., the first and second feedback signals respectively received in the first and second transmitter evaluation stages) are required to determine the target antenna beam (i.e., AoD). Since the same balance puzzle operations may apply to evaluation of the AoA of the receiver end (Rx), four times of the beamforming adjustment for the receiver end (Rx) may be required to determine the AoA when the receiver end (Rx) has a resolution of eight and a situation similar to case A happens. It is noted that, since the receiver end (Rx) may directly determine the signal strength of the training signals received thereby (i.e., the receiver-end signals), feedback operations are not required in the evaluation of AoA of the receiver end (Rx).

In case B, in the first transmitter evaluation stage, the eight antenna beams are divided into a first-stage balance group having six of the antenna beams, and a first-stage remainder group having the remaining two of the antenna beams. The transmitter end (Tx) executes a sector sweeping procedure corresponding to the first-stage balance group to transmit two first-stage training signals respectively through two first-stage bisection antenna sectors (b1, b2) each having the same size of $3\pi/8$. At this time, the receiver end (Rx) may omni-directionally receive the first-stage training signals to obtain first-stage receiver-end signals that respectively correspond to the first-stage training signals, and according to the first-stage receiver-end signals, generate and transmit a first feedback signal that indicates that the first-stage receiver-end signals are unbalanced and which first-stage training signal corresponds to the first-stage receiver-end signal having the greater signal strength. After receipt of the first feedback signal from the receiver end (Rx), the transmitter end (Tx) determines that the target antenna beam is included in the first-stage balance group according to the first feedback signal, and that the target antenna beam is included in a first-stage sub-group of the antenna beams corresponding to the first-stage bisection antenna sector (b1). Accordingly, a number of adjusting beamforming in the first transmitter evaluation stage is two. In the second transmitter evaluation stage, the three antenna beams of the first-stage sub-group are divided based on the balance puzzle concept into a second-stage balance group having two of the antenna beams, and a second-stage remainder group having the remaining one of the antenna beams. The transmitter end (Tx) executes a sector sweeping corresponding to the second-stage balance group to transmit two second-stage training signals respectively through two second-stage bisection antenna sectors (b11, b12) each having the same size of $\pi/8$. At this time, the receiver end (Rx) may omni-directionally receive the second-stage training signals to obtain second-stage receiver-end signals that respectively correspond to the second-stage training signals, and according to the second-stage receiver-end signals, generate and transmit a second feedback signal that indicates that the second-stage receiver-end signals are unbalanced and which second-stage training signal corresponds to the second-stage receiver-end signal having the greater signal strength. After receipt of the second feedback signal from the receiver end (Rx), the transmitter end (Tx) determines that the target antenna beam is included in the second-stage balance group according to the second feedback signal, and that the target antenna beam is the antenna beam corresponding to the second-stage receiver-end signal having the greater signal strength. Accordingly, sector sweeping corresponding to the second-stage remainder group or a sub-group of the second-stage balance group may be omitted, and a number of adjusting beamforming in the second transmitter evaluation stage is two. As a result, in case B, four times of the beamforming adjustment for the transmitter end (Tx) and two feedbacks from the receiver end (Rx) (i.e., the first and second feedback signals respectively received in the first and second transmitter evaluation stages) are required to determine the target antenna beam (i.e., AoD). Since the same balance puzzle operations may apply to the evaluation of the AoA of the receiver end (Rx), four times of the beamforming adjustment for the receiver end (Rx) may be required to determine the AoA when the receiver end (Rx) has a resolution of eight and a situation similar to case B happens.

In case C, in the first transmitter evaluation stage, the eight antenna beams are divided into a first-stage balance group having six of the antenna beams, and a first-stage remainder group having the remaining two of the antenna beams. The transmitter end (Tx) executes a sector sweeping procedure corresponding to the first-stage balance group to transmit two first-stage training signals respectively through two first-stage bisection antenna sectors (c1, c2) each having the same size of $3\pi/8$. At this time, the receiver end (Rx) may omni-directionally receive the first-stage training signals to obtain first-stage receiver-end signals that respectively correspond to the first-stage training signals, and according to the first-stage receiver-end signals, generate and transmit a first feedback signal that indicates that the first-stage receiver-end signals are balanced and which first-stage training signal corresponds to the first-stage receiver-end signal having the greater signal strength. After receipt of the first feedback signal from the receiver end (Rx), the transmitter end (Tx) determines that the target antenna beam is not included in the first-stage balance group according to the first feedback signal, and that the target antenna beam is included in a first-stage remainder group. Accordingly, a number of adjusting beamforming in the first transmitter evaluation stage is two. In the second transmitter evaluation stage, the transmitter end (Tx) executes a sector sweeping procedure corresponding to the first-stage remainder group to transmit two second-stage training signals respectively through two second-stage bisection antenna sectors (c3, c4) each having the same size of $\pi/8$. At this time, the receiver end (Rx) may omni-directionally receive the second-stage training signals to obtain second-stage receiver-end signals that respectively correspond to the second-stage training signals, and according to the second-stage receiver-end signals, generate and transmit a second feedback signal that indicates that the second-stage receiver-end signals are unbalanced and which second-stage training signal corresponds to the second-stage receiver-end signal having the greater signal strength. After receipt of the second feedback signal from the receiver end (Rx), the transmitter end (Tx) determines that the target antenna beam is the antenna beam corresponding to the second-stage receiver-end signal having the greater signal strength. Accordingly, a number of adjusting beamforming in the second transmitter evaluation stage is two. As a result, in case C, four times of the beamforming adjustment for the transmitter end (Tx) and two feedbacks from the receiver end (Rx) (i.e., the first and second feedback signals respectively received in the first and second transmitter evaluation stages) are required to determine the target antenna beam (i.e., AoD). Since the same balance puzzle operations may apply to the evaluation of the AoA of the receiver end (Rx), four times of the beamforming adjustment for the receiver end (Rx) may be required to determine the AoA when the receiver end (Rx) has a resolution of eight and a situation similar to case C happens.

Figure 10:
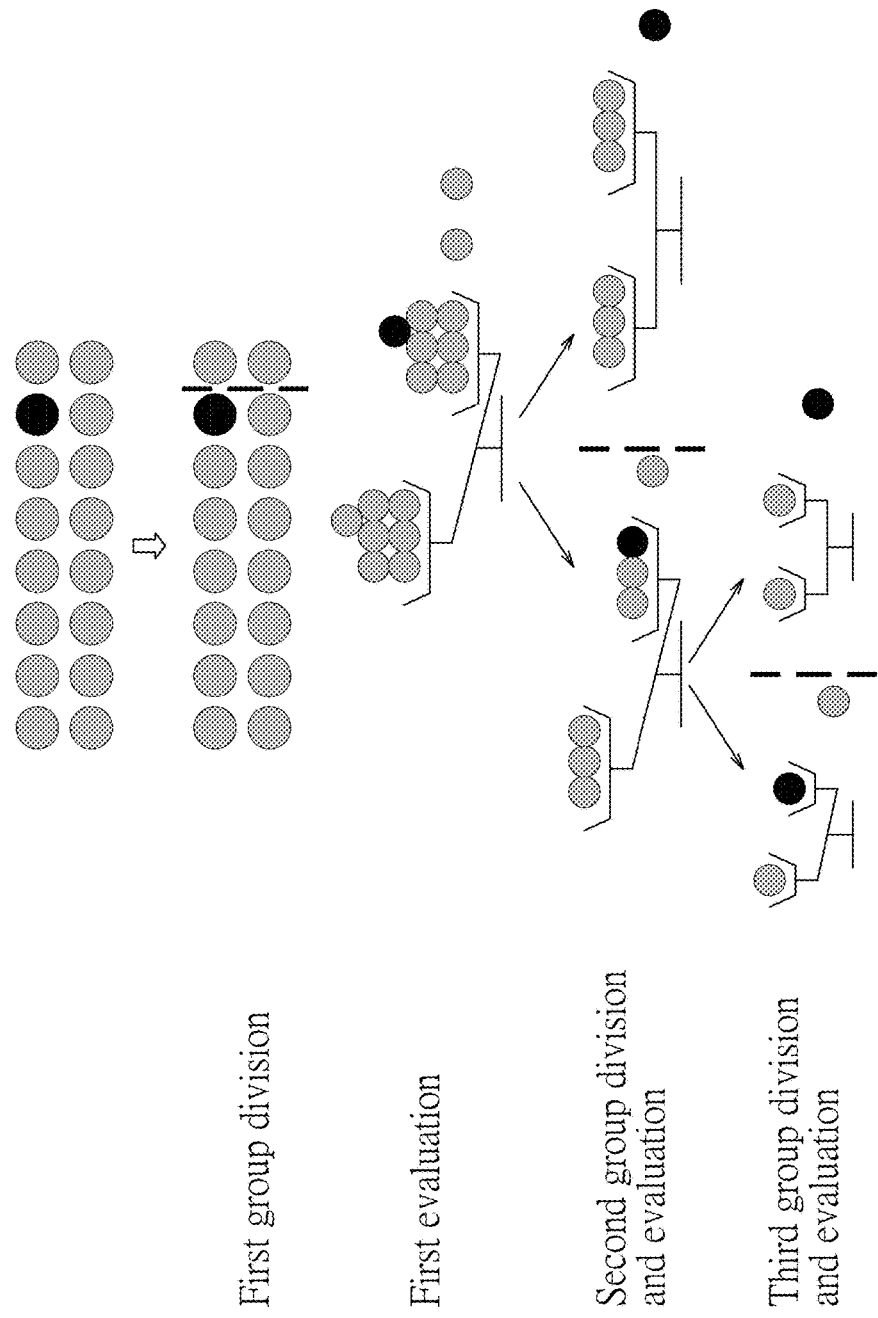
FIGS. 10 and 11 are schematic diagrams illustrating two possible results in the first group division of the embodiment and the following operations when the antenna resolution of the transmitter end is sixteen.
Figure 11:
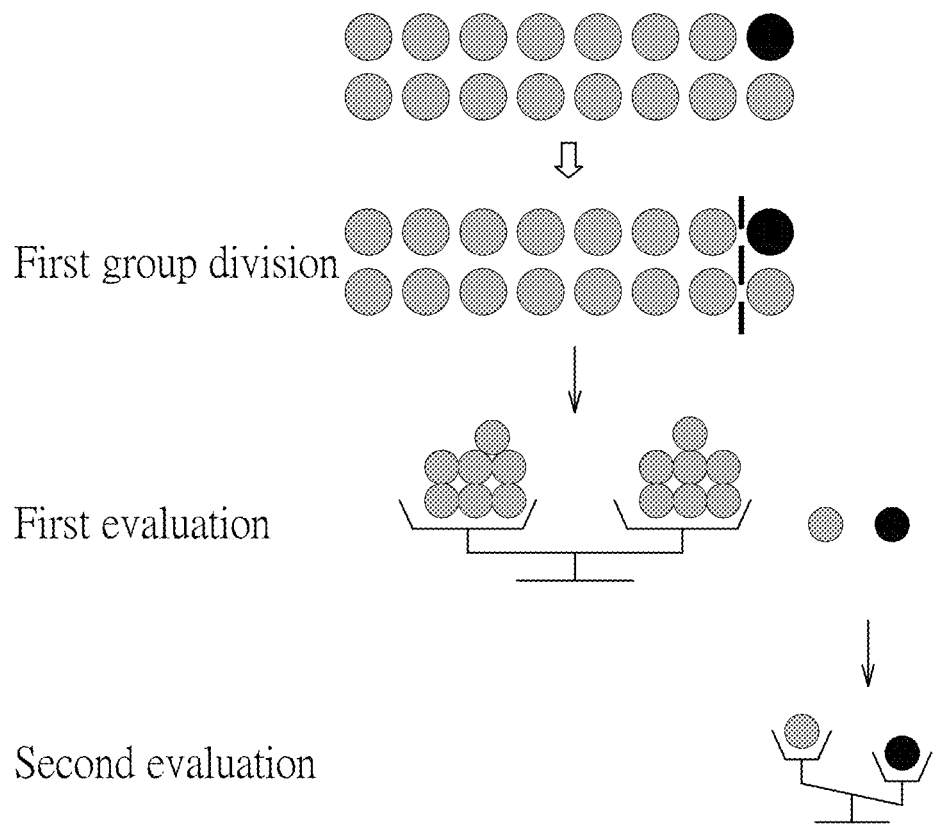

Referring to FIGS. 7, 8, 10 and 11, in an example where the resolution of the antenna array 11 is sixteen (i.e., N=16), based on a difference between orientations of the transmitter end (Tx) and the receiver end (Rx), two different cases may happen when the wireless MIMO communication system 100 implements the embodiment of the antenna beam searching method according to this disclosure. In FIGS. 10 and 11, each of the balls represents an individual antenna beam of the transmitter end (Tx), while the black ball represents a target antenna beam with respect to the receiver end (Rx).

In FIG. 10 which illustrates a first case, at first, the transmitter end (Tx) performs a first group division in which the sixteen antenna beams are divided into a first-stage balance group having fourteen of the antenna beams and a first-stage remainder group having remaining two of the antenna beams. Then, the transmitter end (Tx) performs a first evaluation on the fourteen antenna beams of the first-stage balance group, and determines a sub-group (i.e., a first-stage sub-group) of the first-stage balance group which includes seven antenna beams out of the fourteen antenna beams inclusive of the target antenna beam. After the first evaluation, the transmitter end (Tx) performs a second group division in which the seven antenna beams of the first-stage sub-group are divided into a second-stage balance group having six of the antenna beams and a second-stage remainder group having remaining one of the antenna beams. Then, the transmitter end (Tx) performs a second evaluation on the six antenna beams of the second-stage balance group. Different division results of the second group division may lead to different second evaluations. The left and right sides of the third step in FIG. 10 respectively illustrate a second evaluation corresponding to a first second-stage division result where the target antenna beam is included in the second-stage balance group, and a second evaluation corresponding to a second second-stage division result where the target antenna beam is included in the second-stage remainder group. For the second evaluation corresponding to the second second-stage division result, the target antenna beam may be directly determined to be the antenna beam of the second-stage remainder group without performing any further operation. For the second evaluation corresponding to the first second-stage division result, a third group division and a third evaluation are required to determine the target antenna beam. The transmitter end (Tx) performs the third group division in which the three antenna beams of a second-stage sub-group which is acquired from the second-stage balance group and which includes the target antenna beam are divided into a third-stage balance group having two of the antenna beams and a third-stage remainder group having remaining one of the antenna beams. Then, the transmitter end (Tx) performs the third evaluation on the two antenna beams of the third-stage balance group. Similarly, the left and right sides of the bottom part in FIG. 10 respectively illustrate the third evaluations corresponding to a first third-stage division result where the target antenna beam is included in the third-stage balance group, and the third evaluation corresponding to a second third-stage division result where the target antenna beam is included in the third-stage remainder group. Accordingly, in the first case, the transmitter end (Tx) may require at most six times of beamforming adjustment (two for each of the first, second and third evaluations) with three feedbacks from the receiver end (Rx) (one for each of the first, second and third evaluations) as illustrated in the left side of FIG. 10, or at least four times of beamforming adjustment (two for each of the first and second evaluations) with two feedbacks from the receiver end (Rx) (one for each of the first and second evaluations) to determine the target antenna beam (i.e., AoD) as illustrated in the right side of FIG. 10.

In FIG. 11 which illustrates a second case, at first, the transmitter end (Tx) performs a first group division in which the sixteen antenna beams are divided into a first-stage balance group having fourteen of the antenna beams and a first-stage remainder group having remaining two of the antenna beams. Then, the transmitter end (Tx) performs a first evaluation on the fourteen antenna beams of the first-stage balance group, and determines that the target antenna beam is not included in the first-stage balance group. After the first evaluation, the transmitter end (Tx) performs a second evaluation on the two antenna beams of the first-stage remainder group, and directly determines the target antenna beam according to a result of the second evaluation. Accordingly, in the second case, the transmitter end (Tx) may require only four times of beamforming adjustment (two for each of the first and second evaluations) with two feedbacks from the receiver end (Rx) (one for each of the first and second evaluations) as illustrated in FIG. 11.

Table 1 lists maximum numbers of the evaluations required for the embodiment according to this disclosure for $N=2^3, 2^4, 2^5, 2^6 \ldots$ and $2^n$.

TABLE 1

| N | Beam number of balance group | Beam number of remainder group | Max. evaluation number $(\log_2 8) - 1 = 2$ |
|---|---|---|---|
| 8 | 6 → (3, 3) | 2 | $(\log_2 8) - 1 = 2$ |
| 16 | 14 → (7, 7) | 2 | $(\log_2 16) - 1 = 3$ |
| 32 | 30 → (15, 15) | 2 | $(\log_2 32) - 1 = 4$ |
| 64 | 62 → (31, 31) | 2 | $(\log_2 64) - 1 = 5$ |
| . | | | |
| . | | | |
| $2^n$ | $2^n - 2 \to (2^{n-1} - 1, 2^{n-1} - 1)$ | 2 | $(\log_2 2^n) - 1 = n - 1$ |

Table 2 lists complexity (i.e., required total number of beamforming adjustment) and required total feedback number for the conventional exhaustive search method, the first conventional bisection method, the second conventional bisection method, and the embodiment of this disclosure.

TABLE 2

| | Complexity | Total feedback number |
|---|---|---|
| Conventional exhaustive search method | $N^2$ | 1 |
| First conventional bisection method | $2^2 \log_2 N = 4 \log_2 N$ | $\log_2 N$ |
| Second conventional bisection method | $2(\log_2 N + \log_2 N) = 4\log_2 N$ | $\log_2 N$ |
| Embodiment of this disclosure | $4/N \{N \times (\log_2 N - 3/2) + 4\}$ | $1/N \{N \times (\log_2 N - 3/2) + 4\}$ |

Figure 12:
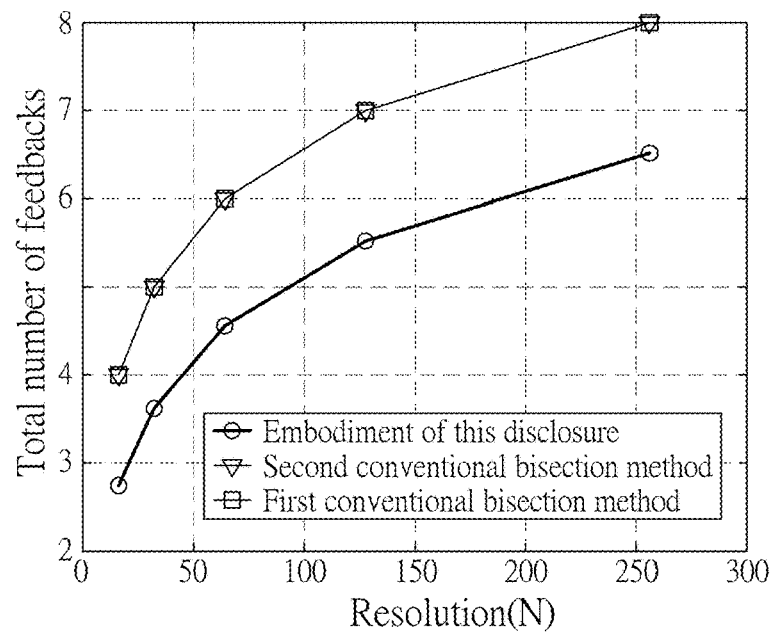
FIG. 12 is a plot showing comparison of the embodiment and the conventional methods in terms of a number of feedbacks.
Figure 13:
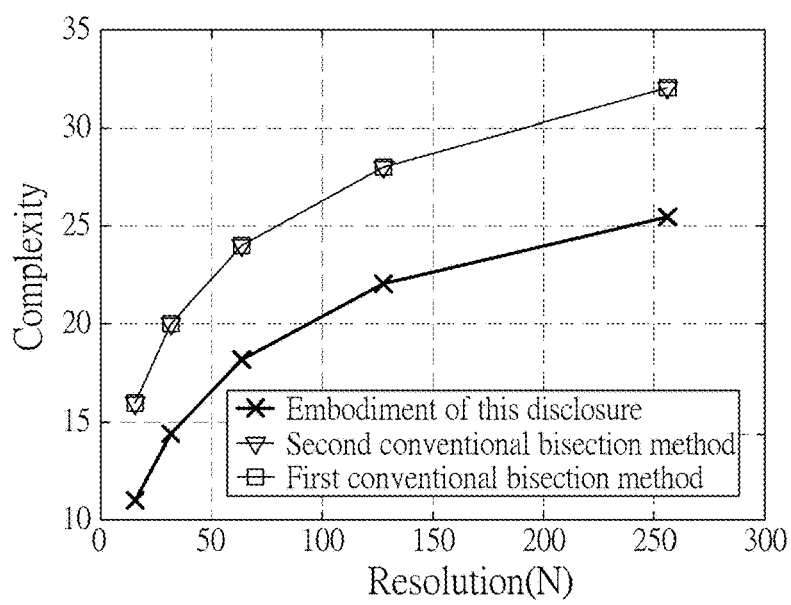
FIG. 13 is a plot showing comparison of the embodiment and the conventional methods in terms of complexity.

FIG. 12 shows a simulation result to compare the conventional bisection methods and the embodiment of this disclosure in terms of required total number of feedbacks. It can be seen that the embodiment requires less number of feedbacks than the conventional bisection methods. FIG. 13 shows a simulation result to compare the conventional bisection methods and the embodiment of this disclosure in terms of complexity. It can be seen that the embodiment has lower complexity than the conventional bisection methods, i.e., fewer beamforming adjustments are required.

In summary, the antenna beam searching method according to this disclosure uses the balance puzzle concept to perform group division, so only a portion of the antenna beams are required to be evaluated. In comparison to the conventional bisection channel training method under an environment of high SNR ratio (i.e., high channel gain), not only can similar precision for channel (i.e., desired beam path/path of the target antenna beam) evaluation be achieved, but lower complexity may also be achieved, favoring MIMO operation. In addition, the antenna beam searching method according to this disclosure may be applicable to a wireless MIMO communication system of any antenna resolution, thereby having wider applicability in comparison to the conventional bisection methods which are only suitable for those having an antenna resolution of a power of two.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An antenna beam searching method comprising:
providing a wireless multi-input multi-output (MIMO) communication system that includes a transmitter end and a receiver end, the transmitter end having a multi-resolution antenna array which supports a plurality of antenna beams having different beam directions, one of the antenna beams being a target antenna beam that corresponds to the receiver end;
dividing, by the transmitter end, the antenna beams into a first-stage balance group which has an even number of the antenna beams and which corresponds to a first-stage balance antenna sector, and a first-stage remainder group which has the antenna beam(s) other than said even number of the antenna beams;
executing, by the transmitter end, a first-stage sector sweeping procedure which is associated with the first-stage balance antenna sector and which employs a balance puzzle concept and a hierarchical multi-resolution codebook;
determining, by the transmitter end upon receipt of a first feedback signal that is associated with a first evaluation result of the first-stage sector sweeping procedure, whether or not the target antenna beam is included in the first-stage balance group according to the first feedback signal;
acquiring, by the transmitter end when determining that the target antenna beam is included in the first-stage balance group, a first-stage sub-group of the antenna beam(s) inclusive of the target antenna beam from the antenna beams of the first-stage balance group according to the first feedback signal, and determining the target antenna beam from the first-stage sub-group by executing a first beam searching procedure that employs the hierarchical multi-resolution codebook; and
determining, by the transmitter end when determining that the target antenna beam is not included in the first-stage balance group, the target antenna beam from the first-stage remainder group by executing a second beam searching procedure that employs the hierarchical multi-resolution codebook.

2. The antenna beam searching method of claim 1, wherein the even number of the antenna beams included in the first-stage balance group is greater than a number of the antenna beams included in the first-stage remainder group.

3. The antenna beam searching method of claim 2, wherein:
when the plurality of antenna beams supported by the antenna array is even in number, the number of the antenna beams included in the first-stage remainder group is an even number greater than or equal to two; and
when the plurality of antenna beams supported by the antenna array is odd in number, the number of the antenna beams included in the first-stage remainder group is an odd number greater than or equal to one.

4. The antenna beam searching method of claim 1, wherein the hierarchical multi-resolution codebook has a plurality of vector groups that respectively have different numbers of beamforming vectors and that respectively correspond to different beam widths.

5. The antenna beam searching method of claim 4, wherein the executing the first-stage sector sweeping procedure includes:
performing sector sweeping on the first-stage balance antenna sector using the balance puzzle concept to generate two training signals based on two of the beamforming vectors each of which has a beam width that matches a respective one of two first-stage bisection antenna sectors bisected from the first-stage balance antenna sector, and transmitting each of the training signals via a corresponding one of the first-stage bisection antenna sectors;
said antenna beam searching method further comprising:
receiving, by the receiver end, two receiver-end signals respectively corresponding to the training signals, and generating and transmitting the first feedback signal according to the receiver-end signals.

6. The antenna beam searching method of claim 5, wherein the generating and transmitting the first feedback signal includes:
determining whether or not a ratio of signal strength of either one of the receiver-end signals to signal strength of the other one of the receiver-end signals is not smaller than a predetermined threshold value to obtain the first evaluation result that indicates whether or not the receiver-end signals are unbalanced in terms of signal strength and which one of the training signals corresponds to one of the receiver-end signals that has the greater signal strength, and generating the first feedback signal which corresponds to the first evaluation result.

7. The antenna beam searching method of claim 6, wherein the first evaluation result indicates that the receiver-end signals are unbalanced in terms of signal strength when the receiver end determines that the ratio of the signal strength of either one of the receiver-end signals to the signal strength of the other one of the receiver-end signals is not smaller than the predetermined threshold value;
wherein, in the determining whether or not the target antenna beam is included in the first-stage balance group, the transmitter end determines that the target antenna beam is included in the first-stage balance group according to the first feedback signal when the first evaluation result indicates that the receiver-end signals are unbalanced in terms of signal strength; and
wherein the first-stage sub-group of the antenna beam(s) includes half of the antenna beams of the first-stage balance group, and corresponds to one of the first-stage bisection antenna sectors via which one of the training signals that is indicated by the first evaluation result as corresponding to one of the receiver-end signals having the greater signal strength is transmitted.

8. The antenna beam searching method of claim 6, wherein the first feedback signal is a 2-bit signal, and has a first bit indicating whether or not the receiver-end signals are unbalanced in terms of signal strength, and a second bit indicating which one of the training signals corresponds to the one of the receiver-end signals that has the greater signal strength.

9. The antenna beam searching method of claim 6, wherein $1 \leq \eta \leq \sqrt{1+SNR}$, where $\eta$ represents the predetermined threshold value, and SNR represents a signal-to-noise ratio of the receiver end.

10. The antenna beam searching method of claim 1, wherein, when a number of the antenna beams included in the first-stage sub-group is not smaller than three, the executing the first beam searching procedure includes:
dividing, by the transmitter end, the antenna beams of the first-stage sub-group into a first second-stage group which corresponds to a second-stage antenna sector included in the first-stage balance antenna sector, and a second second-stage group;
executing, by the transmitter end, a second-stage sector sweeping procedure which is associated with the second-stage antenna sector and which employs the hierarchical multi-resolution codebook;
determining, by the transmitter end upon receipt of a second feedback signal that is associated with a second evaluation result corresponding to the second-stage sector sweeping procedure, whether or not the target antenna beam is included in the first second-stage group according to the second feedback signal;
determining, by the transmitter end when determining that the target antenna beam is included in the first second-stage group, the target antenna beam from the antenna beams of the first second-stage balance group according to the second feedback signal; and
determining, by the transmitter end when determining that the target antenna beam is not included in the first second-stage group, the target antenna beam from the second second-stage group.

11. The antenna beam searching method of claim 10, wherein, when the antenna beams included in the first second-stage group is even in number, the second-stage sector sweeping procedure is same as the first-stage sector sweeping procedure by taking the first second-stage group as the first-stage balance group.

12. The antenna beam searching method of claim 1, further comprising: setting, according to the target antenna beam thus determined, an angle of departure of the multi-resolution antenna array of the transmitter end; and
communicating, by the transmitter end, with the receiver end according to the angle of departure of the multi-resolution antenna array of the transmitter end thus set.

* * * * *